US011558220B2

(12) United States Patent
Boutros et al.

(10) Patent No.: US 11,558,220 B2
(45) Date of Patent: Jan. 17, 2023

(54) UPLINK-AWARE MONITORING OF LOGICAL OVERLAY TUNNELS

(71) Applicant: VMWARE, INC., Palo Alto, CA (US)

(72) Inventors: Sami Boutros, Union City, CA (US); Jerome Catrouillet, Palo Alto, CA (US); Santosh Pallagatti Kotrabasappa, Bagalore (IN); Jia Yu, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/944,205

(22) Filed: Jul. 31, 2020

(65) Prior Publication Data

US 2021/0392016 A1 Dec. 16, 2021

(30) Foreign Application Priority Data

Jun. 15, 2020 (IN) .............................. 202041025118

(51) Int. Cl.
*H04L 12/46* (2006.01)
*H04L 45/64* (2022.01)
*H04L 43/106* (2022.01)
*H04L 43/08* (2022.01)
*H04L 45/28* (2022.01)
*H04L 43/50* (2022.01)

(52) U.S. Cl.
CPC .......... *H04L 12/4633* (2013.01); *H04L 43/08* (2013.01); *H04L 43/106* (2013.01); *H04L 43/50* (2013.01); *H04L 45/28* (2013.01); *H04L 45/64* (2013.01); *H04L 2212/00* (2013.01)

(58) Field of Classification Search
CPC ... H04L 12/4633; H04L 43/08; H04L 43/106; H04L 43/50; H04L 45/28; H04L 45/64; H04L 2212/00; H04L 12/721; H04L 43/14; H04L 12/46
See application file for complete search history.

(56) References Cited

U.S. PATENT DOCUMENTS

| 2016/0127214 A1* | 5/2016 | Tessmer ............... H04L 43/0811 370/252 |
| 2016/0352633 A1* | 12/2016 | Kapadia .................. H04L 41/04 |
| 2017/0346721 A1* | 11/2017 | Bacthu ..................... H04L 45/16 |
| 2018/0287912 A1* | 10/2018 | Zabarsky .............. G06F 3/0635 |
| 2019/0081877 A1* | 3/2019 | Wang .................. H04L 12/4633 |

\* cited by examiner

*Primary Examiner* — Donald L Mills
(74) *Attorney, Agent, or Firm* — Su IP Consulting

(57) ABSTRACT

Example methods and systems for uplink-aware logical overlay tunnel monitoring are described. In one example, a first computer system may establish a logical overlay tunnel with a second computer system. The first computer system may generate and send, over the logical overlay tunnel via the first uplink, a first encapsulated monitoring packet identifying the first uplink. Based on a first reply, first performance metric information associated with the first uplink may be determined. The first computer system may generate and send, over the logical overlay tunnel via the second uplink, a second encapsulated monitoring packet identifying the second uplink. Based on a second reply, second performance metric information associated with the second uplink may be determined. Based on the first performance metric information and the second performance metric information, the first uplink or the second uplink may be selected to send encapsulated data packet(s) over the logical overlay tunnel.

21 Claims, 7 Drawing Sheets

//UPLINK-AWARE MONITORING OF LOGICAL OVERLAY TUNNELS

RELATED APPLICATIONS

Benefit is claimed under 35 U.S.C. § 119(a)-(d) to Foreign Patent Application Serial No. 202041025118 filed in India entitled "UPLINK-AWARE MONITORING OF LOGICAL OVERLAY TUNNELS", on Jun. 15, 2020, by VMware, Inc., which is herein incorporated in its entirety by reference for all purposes.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, VMs supported by different hosts may be deployed on the same logical overlay network. However, logical overlay networks may be susceptible to various performance issues, which affect communication among VMs.

DETAILED DESCRIPTION

Figure 1:
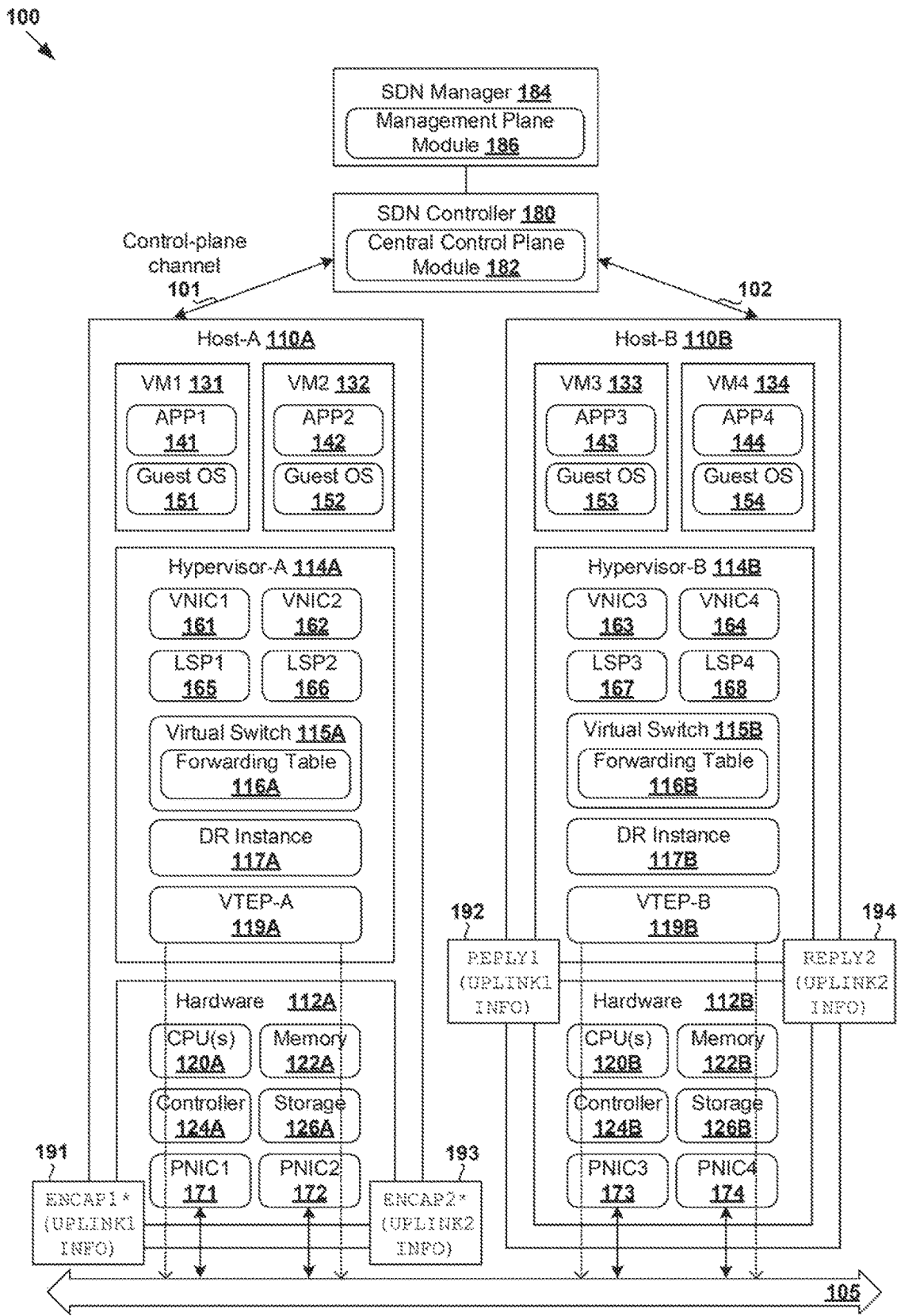
FIG. 1 is a schematic diagram illustrating an example software-defined networking (SDN) environment in which uplink-aware logical overlay tunnel monitoring may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to logical overlay networks will now be explained in more detail using FIG. 1, which is a schematic diagram illustrating example software-defined networking (SDN) environment 100 in which uplink-aware logical overlay tunnel monitoring may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are interconnected via physical network 105. Each host 110A/110B may include suitable hardware 112A/112B and virtualization software (e.g., hypervisor-A 114A, hypervisor-B 114B) to support various VMs. For example, hosts 110A-B may support respective VMs 131-134. Hardware 112A/112B includes suitable physical components, such as central processing unit(s) (CPU(s)) or processor(s) 120A/120B; memory 122A/122B; physical network interface controllers (PNICs) 171-174; and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of virtual machines (VMs).

Hypervisor 114A/114B maintains a mapping between underlying hardware 112A/112B and virtual resources allocated to respective VMs. Virtual resources are allocated to respective VMs 131-134 to support a guest operating system (OS; not shown for simplicity) and application(s) 141-144. For example, the virtual resources may include virtual CPU, guest physical memory, virtual disk, virtual network interface controller (VNIC), etc. Hardware resources may be emulated using virtual machine monitors (VMMs). For example in FIG. 1, VNICs 161-164 are virtual network adapters for VMs 131-134, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 165-168 (labelled "LSP1" to "LSP4") are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

A logical overlay network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with VXLAN network identifier (VNI)=6000.

To facilitate communication among VMs 131-134 deployed on various logical overlay networks, hypervisor 114A/114B may implement a virtual tunnel endpoint (VTEP) to encapsulate and decapsulate packets with an outer header (also known as a tunnel header) identifying a logical overlay network. For example, hypervisor-A 114A implements first VTEP-A 119A associated with (IP address=IP-A, MAC address=MAC-A, VTEP label=VTEP-A) and hypervisor-B 114B implements second VTEP-B 119B with (IP-B, MAC-B, VTEP-B). Encapsulated packets may be sent via a logical overlay tunnel established between a pair of VTEPs over physical network 105, over which respective hosts 110A-B are in layer-3 connectivity with one another.

Figure 2:
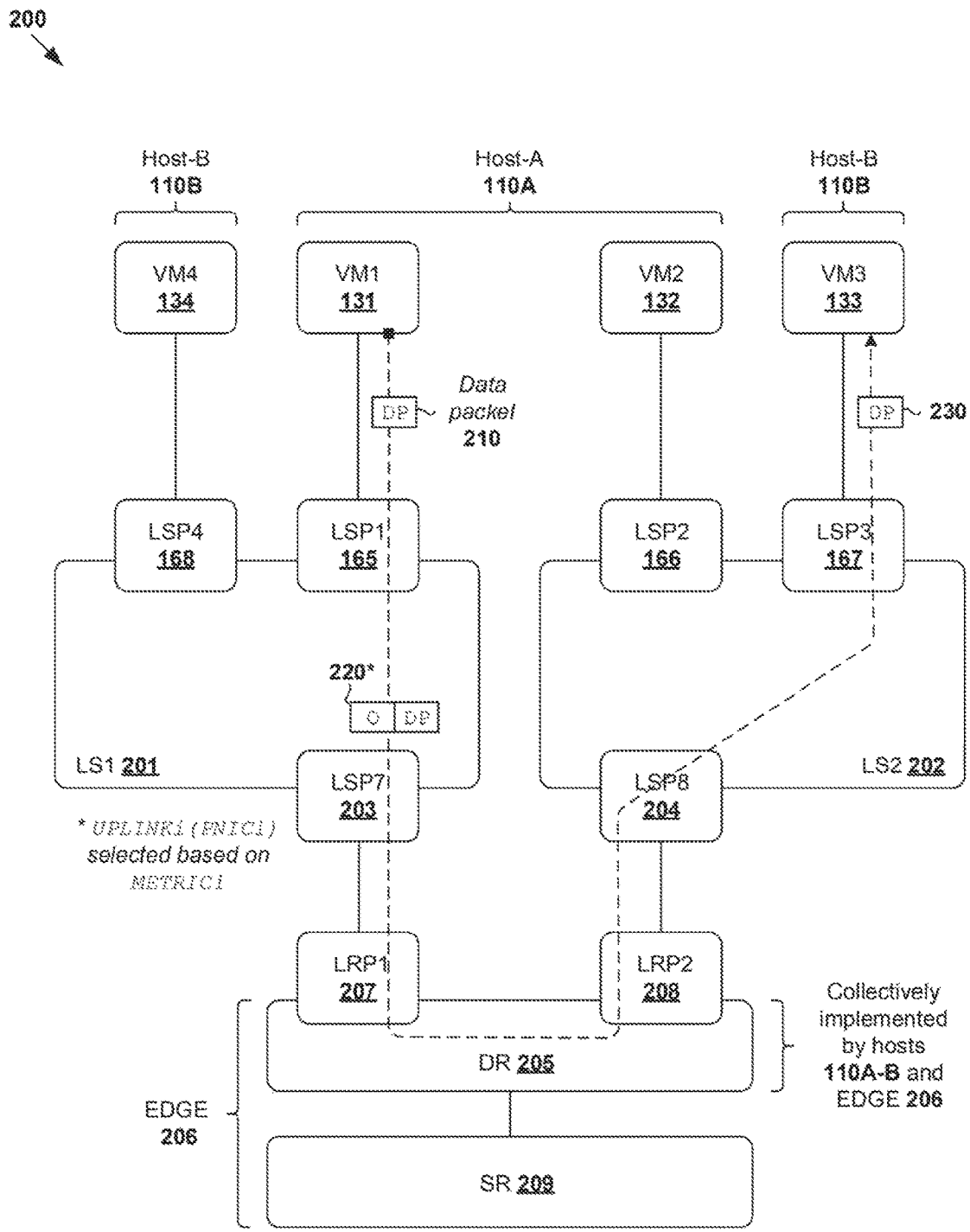
FIG. 2 is a schematic diagram illustrating an example of uplink-aware logical overlay tunnel monitoring in an SDN environment.

Some example logical overlay networks are shown in FIG. 2, which is a schematic diagram illustrating example management plane view 200 of SDN environment 100 in FIG. 1. Here, VM1 131 and VM4 134 are located on a first logical layer-2 segment associated with virtual network identifier (VNI)=5000 and connected to a first logical switch (see "LS1" 201). VM2 132 and VM3 133 are located on a second logical layer-2 segment associated with VNI=6000 and connected to a second logical switch (see "LS2" 202). With the growth of infrastructure-as-a-service (IaaS), logical overlay networks may be deployed to support multiple tenants. In this case, each logical overlay network may be designed to be an abstract representation of a tenant's network in SDN environment 100. Depending on the desired implementation, a multi-tier topology may be used to isolate multiple tenants.

A logical DR (see "DR" 205) connects logical switches 201-202 to facilitate communication among VMs 131-134 on different segments. See also logical switch ports "LSP7" 203 and "LSP8" 204, and logical router ports "LRP1" 207 and "LRP2" 208 connecting DR 205 with logical switches 201-202. Logical switch 201/202 may be implemented collectively by multiple hosts 110A-B, such as using virtual switches 115A-B and represented internally using forwarding tables 116A-B. DR 205 may be implemented collectively by multiple transport nodes, such as using edge node 206 and hosts 110A-B. For example, DR 205 may be implemented using DR instances 117A-B and represented internally using routing tables (not shown) at respective hosts 110A-B.

Edge node 206 (labelled "EDGE") may implement one or more logical DRs and logical service routers (SRs), such as DR 205 and SR 209 in FIG. 2. SR 209 may represent a centralized routing component that provides centralized stateful services to VMs 131-134, such as IP address assignment using dynamic host configuration protocol (DHCP), load balancing, network address translation (NAT), etc. EDGE 206 may be implemented using VM(s) and/or physical machines ("bare metal machines"), and capable of performing functionalities of a switch, router (e.g., logical service router), bridge, gateway, edge appliance, or any combination thereof. In practice, EDGE 206 may be deployed at the edge of a geographical site to facilitate north-south traffic to an external network, such as another data center at a different geographical site.

In the example in FIG. 1, hosts 110A-B are configured to be "multi-homed" computer systems. Here, the term "multi-homed" may refer generally to a computer system that is configured with multiple interfaces (e.g., multiple PNICs) to provide multiple uplink connections ("uplinks") to physical network 105. In the case of two uplinks (dual homed), host-A 110A is configured with interfaces PNIC1 171 and PNIC2 172 for VTEP-A 119A to reach VTEP-B 119B via separate uplinks. Similarly, VTEP-B 119B on host-B 110B may send logical overlay network traffic via PNIC3 173 and PNIC4 174. In practice, multi-homing may be implemented to provide redundancy to protect hosts 110A-B from single-point failures, facilitate load sharing, and improve performance. Note that host 110A/B may be configured with any suitable number of interfaces to provide any suitable number off connections to physical network 105.

Using a leaf-and-spine architecture, underlying physical network 105 supporting various logical overlay tunnels may include multiple leaf switches that are interconnected with multiple spine switches. A leaf switch is also referred to as a top-of-rack (ToR) switch because it provides network access to hosts 110A-B located at a particular rack. Using host-A 110A as an example, a first uplink may be connected with a first leaf switch, and a second uplink with a second leaf switch. A spine switch extends the physical network fabric of leaf switches to provide connectivity between racks. Using a full-mesh topology, each leaf switch is connected to each one of the spine switches such that east-west traffic from one rack to another is equidistant with a deterministic number of hops. Ports on a spine switch may connect to leaf switches using layer-2 switching and/or layer-3 routing technologies.

One of the challenges in SDN environment 100 is to maintain connectivity between VTEPs 119A-B over a logical overlay tunnel to facilitate communication among VMs 131-134. To achieve this, one approach is to establish a monitoring session to monitor such logical overlay tunnel, such as using bidirectional forwarding detection (BFD), connectivity fault management (CFM) or any other continuity check protocol, etc. Conventionally, however, not all uplinks supporting a logical overlay tunnel may be monitored using this approach. For example in FIG. 1, when running a BFD session between hypervisors 114A-B, BFD packets from host-A 110A to host-B 110B may only be sent using one uplink, which leaves the remaining uplinks unmonitored.

Logical Overlay Tunnel Monitoring

According to examples of the present disclosure, an "uplink-aware" approach for logical overlay tunnel monitoring may be implemented to improve logical overlay network performance. In particular, host 110A/110B may monitor a logical overlay tunnel by generating and sending encapsulated monitoring packets via each of multiple uplinks. This way, multiple uplinks supporting the logical overlay tunnel may be monitored and their performance metric determined to facilitate logical overlay network traffic forwarding.

As used herein, the terms "uplink" and "downlink" are relative terms that describe connections between computer systems, but do not imply any particular physical location of the computer systems. For example, from the perspective of host 110A/B, the term "uplink" may refer generally to a network connection from host 110A/B to a physical network device (e.g., ToR switch, spine switch, router) in physical network 105. The term downlink, on the other hand, may refer to a connection from physical network 105 to host 110A/B. Depending on the desired implementation, an "uplink" may represent a logical construct for a connection via a PNIC. In one example, the mapping between uplink and PNIC(s) may be one-to-one (i.e., one PNIC per uplink). In another example, a one-to-many mapping may be implemented using a NIC teaming policy to map multiple PNICs to one uplink. Here, the term "NIC teaming" may refer generally the grouping of multiple physical NICs into one logical NIC. Throughout the present disclosure, various examples will be described using a "first uplink" that is mapped to PNIC1 171 and a "second uplink" to PNIC2 172. Each uplink may be assigned with a MAC address for sending out packets, such as MAC-UPLINK1 for the first uplink and MAC-UPLINK2 for the second uplink.

Figure 3:
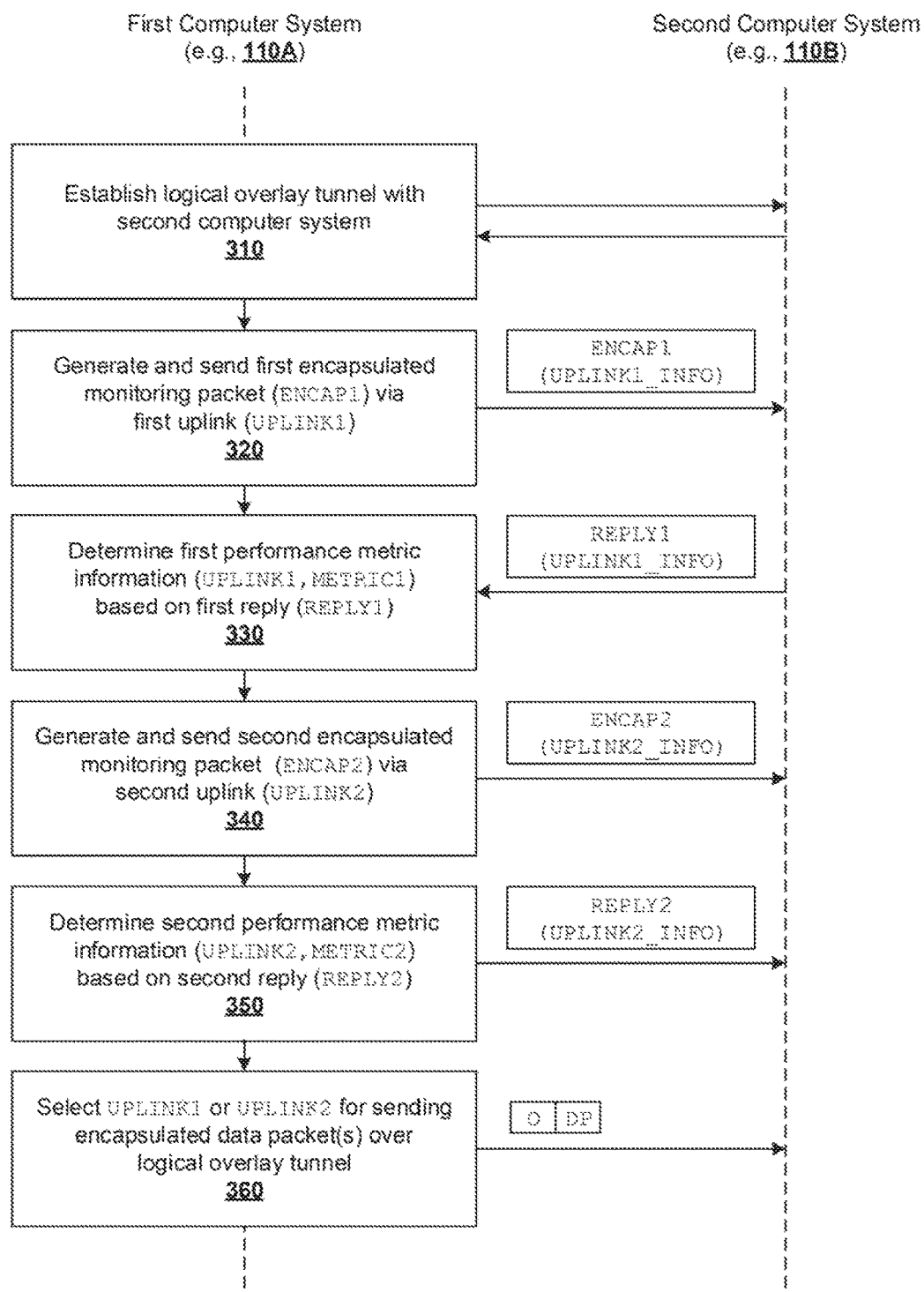
FIG. 3 is a flowchart of an example process for a computer system to perform uplink-aware logical overlay tunnel monitoring in an SDN environment.

In more detail, FIG. 3 is a flowchart of example process 300 for a computer system to perform uplink-aware logical overlay tunnel monitoring in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. In the following, various examples will be explained using host-A 110A as an example "first computer system," host-B 110B as an example "second computer system," and BFD an example protocol for uplink-aware logical overlay tunnel monitoring.

At 310 in FIG. 3, a logical overlay tunnel may be established between host-A 110A and host-B 110B, which is reachable from host-A 110A via a first uplink and a second uplink. At 320, host-A 110A may generate and send, via the first uplink and over the logical overlay tunnel, a first encapsulated monitoring packet identifying the first uplink. At 330, based on a first reply identifying the first uplink from host-B 110B, host-A 110A may determine first performance metric information (METRIC1) associated with the first uplink. See "ENCAP1" 191 and "REPLY1" 192, both identifying the first uplink (see "UPLINK1_INFO") in FIG. 1 and FIG. 3.

At 340 in FIG. 3, host-A 110A may generate and send, via the second uplink and over the logical overlay tunnel, a second encapsulated monitoring packet identifying the second uplink. At 350, host-A 110A may determine second performance metric information (METRIC2) associated with the second uplink based on a second reply identifying the second uplink from host-B 110B. See "ENCAP2" 193 and "REPLY2" 194, both identifying the second uplink (see "UPLINK2_INFO") in FIG. 1 and FIG. 3.

As will be explained using FIG. 4 and FIG. 5, ENCAP1 191 may be generated at block 320 by encapsulating a first inner packet with a first outer header. The first inner packet may be an echo packet that causes host-B 110B to loop back or return the first inner packet, being first reply (REPLY1) 192. Similarly, second encapsulated monitoring packet (ENCAP2) 193 may be generated by encapsulating a second inner packet with a second outer header. The second inner packet may be an echo packet that causes host-B 110B to loop back the second inner packet, being second reply (REPLY2) 194. In these examples, ENCAP1 191 may specify interface name="UPLINK1_INFO" to identify the first uplink, and ENCAP2 192 may specify "UPLINK2_INFO" to identify the second uplink. The information (e.g., "UPLINK1_INFO" and "UPLINK2_INFO") identifying a particular uplink may be an ID, MAC address or internal tag that is uniquely assigned to the uplink.

At 360 in FIG. 3, host-A 110A may handle logical overlay network traffic based on the first performance metric information (METRIC1) and the second performance metric information (METRIC2) to select the first uplink or the second uplink to send one or more encapsulated data packets. An example logical overlay network traffic handling is shown in FIG. 2, where VM1 131 attached to LS1 201 sends a data packet (see "DP" 210) to VM3 133 on LS2 202. Since VM1 131 and VM3 133 are located on different hosts 110A-B, source VTEP-A 119A may generate an encapsulated data packet (see 220 in FIG. 2) by encapsulating data packet 210 with an outer header. Based on "uplink-aware" performance metric information 240-250, encapsulated data packet 220 may be sent via the first uplink or the second uplink to reach destination VTEP-B 119B where decapsulation is performed (see also 230).

Examples of the present disclosure may be implemented to support uplink failure detection and handling. For example, the failure on an uplink may be detected based on replies, or the absence of replies, from host-B 110B. In this case, a failover may be performed to direct logical overlay network traffic from the failed uplink to an operating uplink. Various examples will be discussed below.

Logical Overlay Tunnel Establishment

Figure 4:
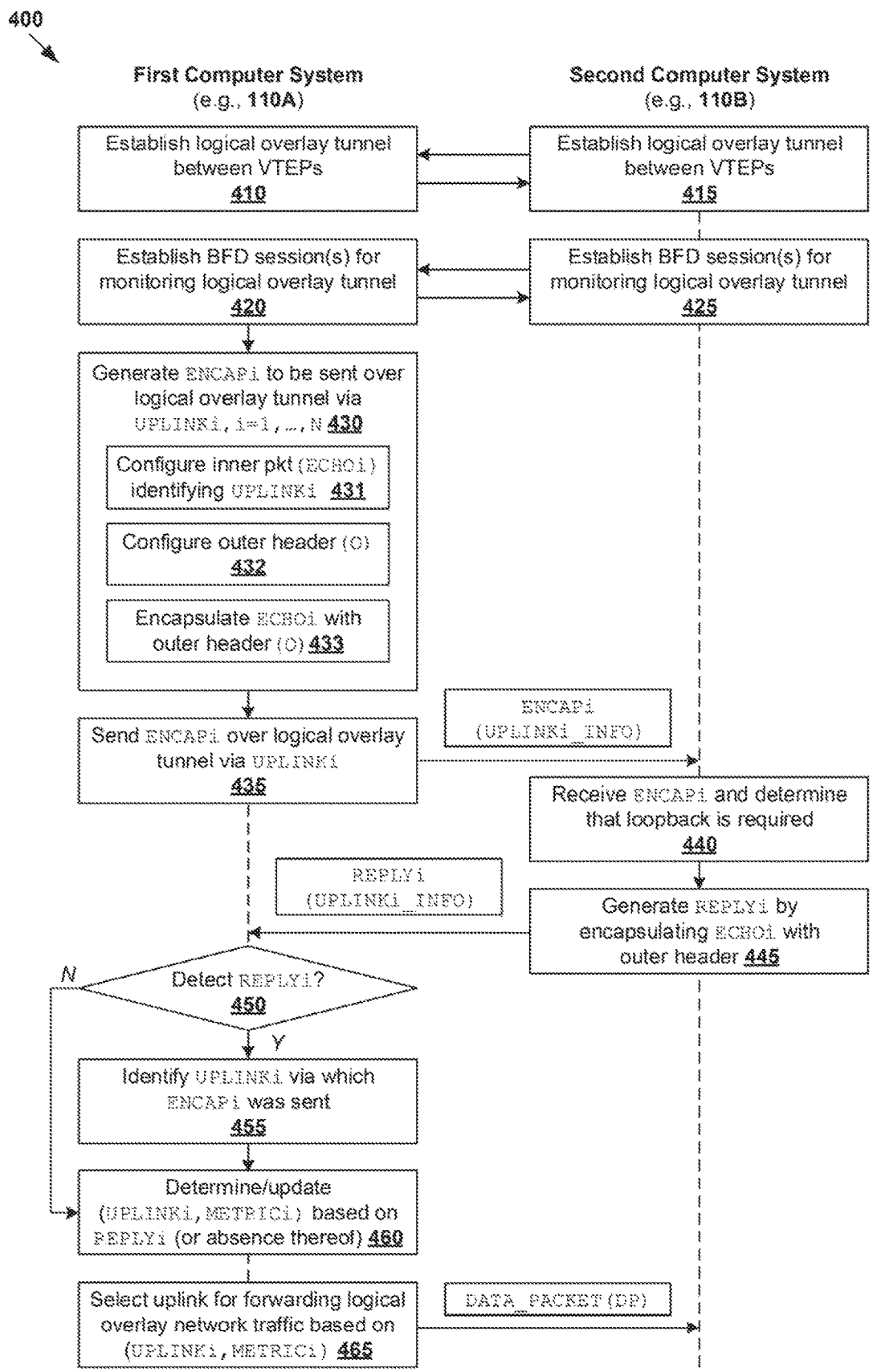
FIG. 4 is a flowchart of an example detailed process for a computer system to perform uplink-aware logical overlay tunnel monitoring in an SDN environment.

FIG. 4 is a flowchart of example detailed process 400 for uplink-aware logical overlay tunnel monitoring in SDN environment 100. Example process 400 may include one or more operations, functions, or actions illustrated at 410 to 465. The various operations, functions or actions may be combined into fewer blocks, divided into additional blocks, and/or eliminated depending on the desired implementation. The example in FIG. 4 will be explained using FIG. 5, which is a schematic diagram illustrating first example 500 of uplink-aware logical overlay tunnel monitoring in SDN environment 100.

At 410-415 in FIG. 4, host-A 110A and host-B 110B may establish a logical overlay tunnel (see 501 in FIG. 5) may be established between VTEP-A 119A and VTEP-B 119B to facilitate communication among VMs 131-134. One example tunneling protocol for establishing logical overlay tunnel 501 is GENEVE, in which case packets forwarded over logical overlay tunnel 501 are each encapsulated with an outer GENEVE header that is addressed from one VTEP to another. In practice, logical overlay tunnels may be established over physical network 105 using any suitable transport protocol, such as UDP, etc.

At 420-425 in FIG. 4, host-A 110A and host-B 110B may establish a monitoring session to monitor logical overlay tunnel 501. Any fault detection or continuity check protocol suitable for monitoring purposes may be used, such as BFD that is defined in the Internet Engineering Task Force (IETF) Request for Comments (RFC) 5880, etc. In general, BFD provides a low-overhead, short-duration detection of forwarding path failures. Using an asynchronous mode, for example, BFD control packets are sent over a BFD session periodically. BFD is intended as an Operations, Administration and Maintenance (OAM) mechanism for connectivity check and connection verification.

Depending on the desired implementation, blocks 420-425 may involve enabling an echo function for the monitoring session over logical overlay tunnel 501. Once an asynchronous BFD (A-BFD) session is established, for example, echo packets transmitted by one host-A 110A via logical overlay tunnel 501 will be "looped back" or "switched back" by recipient host-B 110B to sender host-A 110A. In other words, in response to receiving an echo packet from host-A 110A, host-B 110B will return the echo packet to host-A 110A to facilitate logical overlay tunnel monitoring and performance metric measurement.

In another example, the monitoring session may be established according to a seamless BFD (S-BFD) protocol, which is defined in IETF RFC 7880. In general, S-BFD is a simplified mechanism for using BFD with a large proportion of negotiation aspects eliminated, thus providing benefits such as quick provisioning, as well as improved control and flexibility for hosts 110A-B initiating path monitoring. The concept of S-BFD function is similar to the asynchronous BFD echo function. S-BFD echo packets have the destination of "self." As such, S-BFD echo packets are also self-generated and self-terminating after being sent via an uplink.

Encapsulated Echo Packets

At 430-435 in FIG. 4, VTEP-A 119A supported by source host-A 110A may generate and send multiple (N) encapsulated monitoring packets (ENCAPi) over logical overlay tunnel 501 via respective uplinks (UPLINKi), where using index i=1, N. For simplicity, a particular uplink (UPLINKi) may be identified based on its associated interface name ("UPLINKi_INFO"). Each encapsulated monitoring packet may be configured to cause a destination VTEP to loop back an inner packet to a source VTEP. In practice, host-A 110A may alternate the transmission of encapsulated monitoring packets among the multiple (N) uplinks. Block 430 may be performed according to any suitable protocol such as BFD for IPv4 and IPv6 (single hop) defined in IETF RFC 5881. Some examples are discussed below.

Figure 5:
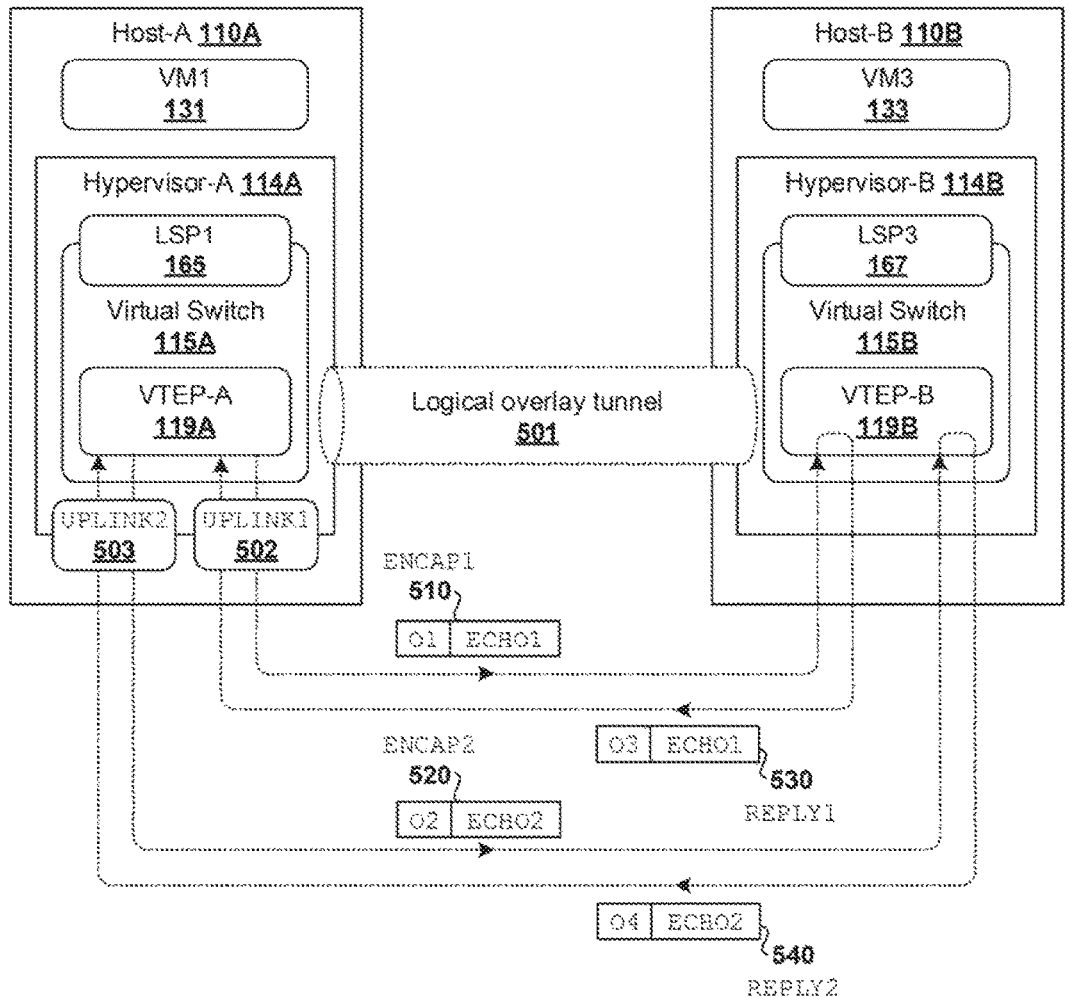
FIG. 5 is a schematic diagram illustrating a first example of uplink-aware logical overlay tunnel monitoring in an SDN environment.

In the example in FIG. 5, multihoming may be implemented on host-A 110A by configuring VTEP-A 119A with VTEP IP address=IP-A, which is a loopback IP address that is reachable via multiple uplinks (see 502-503). In this case, the loopback VTEP IP address may float on two uplink ports that are mapped to respective PNIC1 171 and PNIC2 172. When PNIC1 171 is mapped to the first uplink (i=1), an egress packet sent via PNIC1 171 may specify source MAC address=MAC-UPLINK1 of the first uplink. When PNIC2 172 is mapped to the second uplink (i=2), an egress packet sent via PNIC2 172 may specify source MAC address=MAC-UPLINK2 of the second uplink. A router or switch connected to host-A 110A on the uplink may have a static route to the loopback with its nexthop set to the uplink's IP address. Using this example configuration, it is generally not necessary to implement link aggregation control protocol (LACP), or configure one VTEP per PNIC.

Using the dual-homed example in FIG. 5 (N=2), block 430 may involve generating (a) first encapsulated monitoring packet 510 (ENCAP1) for monitoring a first uplink denoted as UPLINK1 502 and (b) second encapsulated monitoring packet 520 (ENCAP2) for monitoring a second uplink denoted as UPLINK2 503. To monitor a particular uplink, encapsulated monitoring packets 510-520 may be configured with payload information to identify a particular uplink via which encapsulated monitoring packets 510-520 are sent. Using BFD for example, an encapsulated monitoring packet may be generated by encapsulating an inner BFD echo packet with outer header information.

The outer header information may include outer MAC addresses, outer IP addresses and an outer UDP port number, etc. The inner encapsulated monitoring packet may include inner header information (e.g., inner MAC addresses, inner IP addresses, inner port numbers) and payload information, which includes an interface name (e.g., 32-bit value) identifying an uplink (UPLINKi), a sequence number (e.g., 64 bits) and a timestamp (e.g., 64 bits). The sequence number may be a monotonically increasing number to facilitate packet loss measurement. The timestamp may be used for delay measurement. See 431, 432 and 433 in FIG. 4.

In the example in FIG. 5, first encapsulated monitoring packet (ENCAP1) 510, may be generated by encapsulating a first inner echo packet (ECHO1) 512 with a first outer header (O1) 511. In particular, first outer header information (O1) specifying source VTEP IP address=IP-A associated with VTEP-A 119A, destination VTEP IP address=IP-B associated with VTEP-B 119B and outer UDP port number=6081. In the case of GENEVE encapsulation, "0" bit may be set to indicate that first encapsulated monitoring packet 510 is an Operations, Administration and Maintenance (OAM) packet. Depending on the desired implementation, VNI=0 may be set in outer header 511.

Referring to ECHO1 512, inner header information (I1) may specify source MAC address=MAC-A associated with VTEP-A 119A, source VTEP IP address=IP-A and inner UDP port number=3785 and time to live (TTL)=1. The inner header information may specify a destination IP address associated with source host-A 110A to trigger a loopback by destination host-B 110. One example destination IP address associated with host-A 110A is source VTEP IP address=IP-A assigned to VTEP-A 119A (shown in FIG. 5). Another example destination IP address=IP-VM1 assigned to VM1 131, IP-VM1 being an IP address that is routable or reachable via VTEP-A 119A. Payload information (P1) of ECHO1 512 may specify interface name=UPLINK1_INFO" identifying the first uplink (i.e., UPLINK1 502), a timestamp=T1 and a sequence number=S1 that is incremented monotonically. See 510, 511 and 512 in FIG. 5.

Second encapsulated monitoring packet (ENCAP2) 520 may be generated by encapsulating a second inner echo packet (ECHO2) 522 with second outer header information (O2) 521. In particular, second outer header information (O2) and inner header information (I2) of ECHO2 522 may have similar layer-2 (e.g., MAC addresses), layer-3 (e.g., IP addresses) and layer-4 information (e.g., UDP port numbers) to trigger a loopback at host-B 110B. Unlike ECHO1 512, the payload information (P2) of ECHO2 522 may specify a different uplink associated with interface name="UPLINK2_INFO" identifying the second uplink (i.e., UPLINK2 503). Similarly, ENCAP2 520 may include a timestamp=T2 and a sequence number=S2. See 520, 521 and 522 in FIG. 5.

At 440-445, in response to receiving encapsulated monitoring packet 510/520, destination VTEP-B 119B supported by host-B 110B may respond with respective first reply (REPLY1) 530 and second reply (REPLY2) 540. Using the echo function discussed above, REPLY1 530 may be generated by encapsulating ECHO1 512 from host-A 110A with third outer header information (O3). Similarly, REPLY2 540 may be generated by encapsulating ECHO2 522 received by host-B 110B with different outer header information (O4) on the return path.

In both cases, outer header information (O3/O4) may specify source address=IP-B associated with VTEP-B 119B on host-A 110A and destination IP-A associated with VTEP-A 119A on host-A 110A. See 531 and 541 in FIG. 5. To track a particular uplink, REPLY1 530 may include first payload information (P1) identifying UPLINK1 502 used for sending ENCAP1 510; see interface name="UPLINK1_INFO" of ECHO1 512. Similarly, REPLY2 540 may include second payload information (P2) identifying UPLINK2 503 used for sending ENCAP2 520; see interface name="UPLINK2_INFO" of ECHO2 522.

Figure 6:
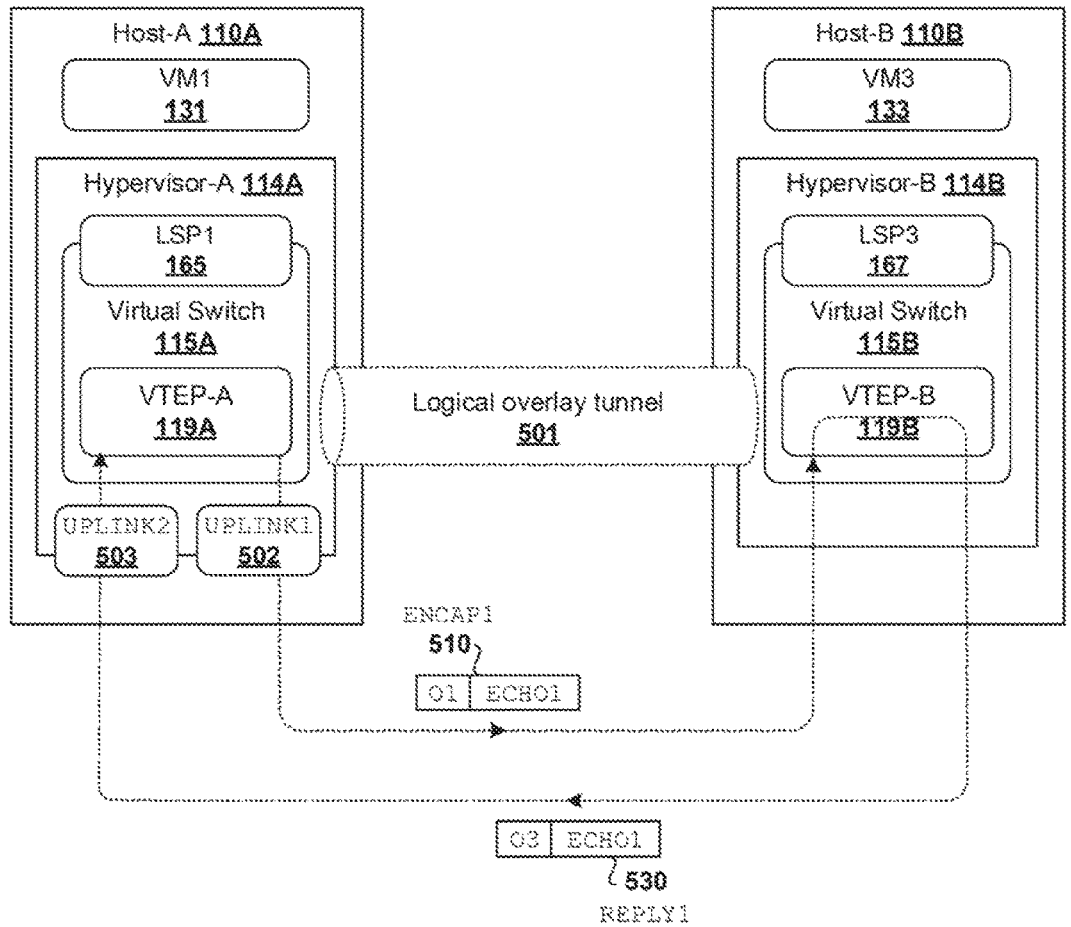
FIG. 6 is a schematic diagram illustrating a second example of uplink-aware logical overlay tunnel monitoring in an SDN environment.

In practice, REPLY1 530 is not necessarily received via UPLINK1 502, which is used by host-A 110A to send corresponding ENCAP1 510. An example is shown in FIG. 6, which is a schematic diagram illustrating second example 600 of uplink-aware logical overlay tunnel monitoring in SDN environment 100. Here, ENCAP1 510 may be sent by host-A 110A using UPLINK1 502. On the return path where ECHO1 512 is looped back, REPLY1 530 sent by host-B 110B may be received by host-A 110A using UPLINK2 503. In the examples in both FIG. 5 and FIG. 6, host-A 110A may determine that REPLY1 530 is a response to ENCAP1 510 based on interface name="UPLINK1 INFO" in the payload of ECHO1 512.

The ease of uplink identification may be observed for logical overlay tunnel monitoring using ENCAP2 520. Although ENCAP2 520 was sent using UPLINK2 503, REPLY2 540 may be received via UPLINK1 502. As such, by configuring REPLY2 540 to identify the second uplink based on interface name="UPLINK2_INFO", host-A 110A may determine performance metric information associated with that uplink. Examples of the present disclosure are scalable to any suitable number of uplinks supported by each host 110A/110B.

Performance Metric Information

At 450-455 in FIG. 4, in response to receiving REPLY1 530, host-A 110A may identify the first uplink by parsing first payload information (P1) that specifies interface name="UPLINK1 INFO." Similarly, in response to receiving REPLY2 520, host-A 110A may identify second uplink based on interface name="UPLINK2_INFO" in REPLY2 520. At 460 in FIG. 4, host-A 110A may determine first performance metric information (METRIC1) associated with the first uplink based on REPLY1 530, and second performance metric information (METRIC2) associated with the second uplink based on REPLY2 540.

Figure 7:
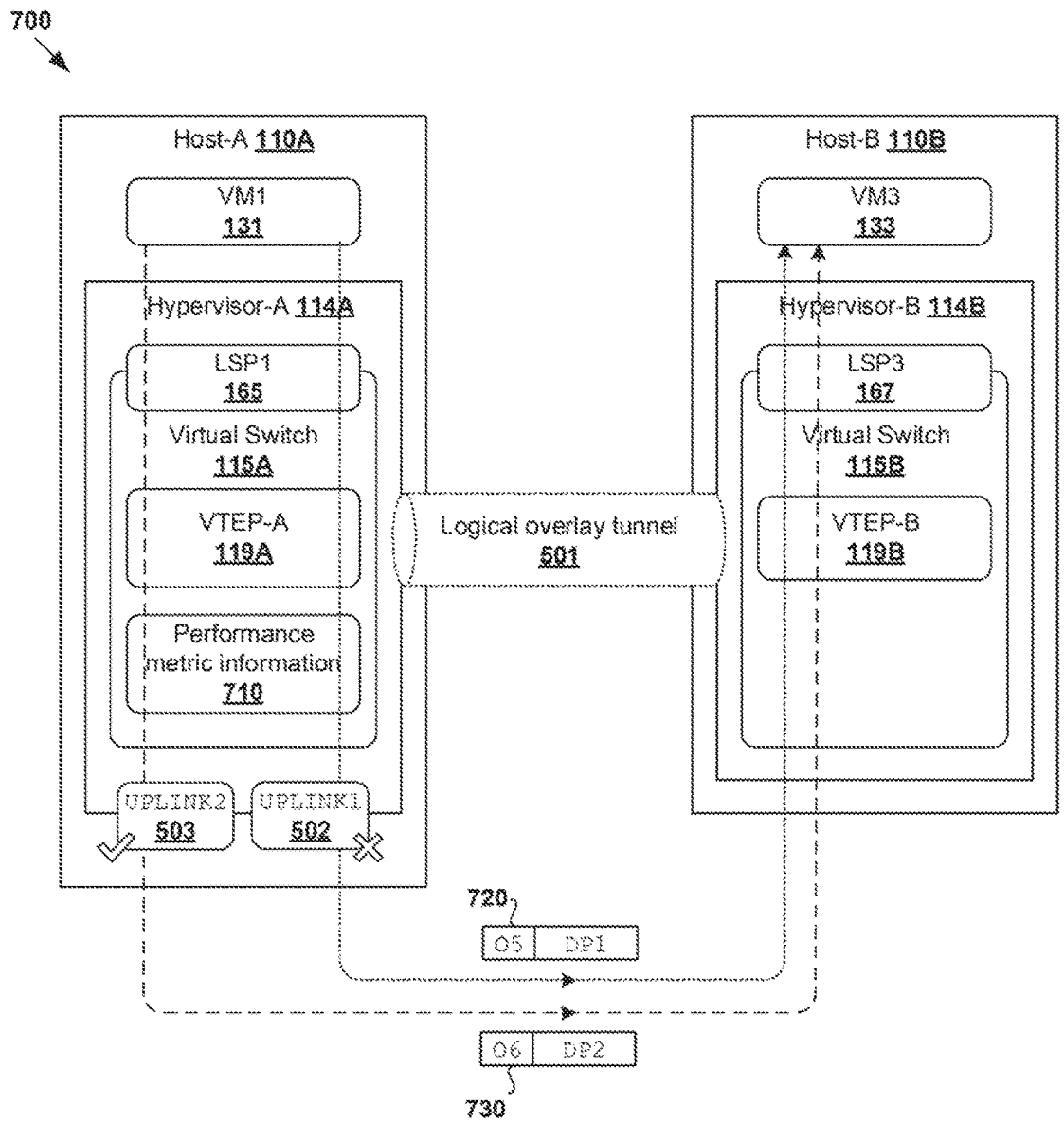
FIG. 7 is a schematic diagram illustrating an example traffic handling based on uplink-aware logical overlay tunnel monitoring in an SDN environment.

Some examples are shown in FIG. 7, which is a schematic diagram illustrating example traffic handling 700 based on uplink-aware logical overlay tunnel monitoring in SDN environment 100. In this example, block 460 may involve determining METRIC1 711 associated with the first uplink (i.e., UPLINK1 502) and METRIC2 712 associated with the second uplink (i.e., UPLINK2 503). Any suitable uplink-based performance metric information 711/712 may be determined, such as connectivity status (e.g., UP or DOWN), packet latency or delay, packet loss, etc.

In practice, packet latency may refer generally to the time required to transmit a packet belonging to the flow from a source to a destination, such as round-trip time (RTT), etc. Latency (e.g., RTT) or delay may be calculated based on a difference between a received timestamp and a sent timestamp, such as T1 in REPLY1 530 and T2 in REPLY2 540. Packet loss may refer generally to the number of packets lost per a fixed number (e.g., 100) of packets sent, such as based on monotonically increasing sequence number=S1 in REPLY1 530 and sequence number=S2 in REPLY2 540.

Note that, if connectivity via a particular uplink is lost, host-A 110A may not receive any reply from host-B 110B. For example, in response to detecting no reply to ENCAP2 520 after a period of time, host-A 110A may determine that ENCAP2 520 (or REPLY2 540) is lost. In this case, second performance metric information (METRIC2) associated with second uplink may be updated to indicate the connectivity issue. See. In practice, host-A 110A may continue sending encapsulated monitoring packets via PNIC2 172 for a period of time. If no reply is received after a timeout period, a connectivity status associated with the second uplink may be updated from UP to DOWN.

At 465 in FIG. 4, logical overlay network traffic handling may be performed based on METRIC1 711 associated with UPLINK1 502 and METRIC2 712 associated with UPLINK2 503. In particular, in response to detecting an egress data packet (DP1) from VM1 131 to VM3 133, VTEP-A 119A may perform encapsulation to generate an encapsulated data packet (see 720). Outer header information (O5) may be configured to specify VTEP IP address information (source=IP-A, destination=IP-B), while the inner data packet (DP1) may specify VM IP address information (source=IP-VM1, destination=IP-VM3). In one scenario where the first uplink is healthy (e.g., connectivity status=UP and RTT<threshold), encapsulated data packet 720 may be sent using UPLINK1 502.

In another scenario where a failure or performance degradation of the first uplink is detected, the second uplink may be selected over the first uplink. In this case, in response to detecting a subsequent egress data packet (DP2) from VM1 131 to VM3 133, VTEP-A 119A may perform encapsulation to generate an encapsulated data packet (see 730) and send it using UPLINK2 503. Similarly, outer header information (06) may be configured to specify VTEP IP address information (source=IP-A, destination=IP-B), and the inner data packet (DP1) specifying VM IP address information (source=IP-VM1, destination=IP-VM3).

The failure or performance degradation may be detected according to blocks 450-460, such as based on multiple instances of REPLY1 530 (or absence thereof). Performance degradation may also be detected by comparing a particular performance metric with a predetermined threshold for detecting, for example, that RTT has exceeded a quality of service threshold. Using examples of the present disclosure, logical overlay tunnel monitoring may be performed for multi-homed devices such as hosts 110A-B to improve logical overlay network performance.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-134. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7. For example, the instructions or program code, when executed by the processor of the computer system, may cause the processor to implement a "network device" to perform connectivity check according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first computer system to perform uplink-aware logical overlay tunnel monitoring, the method comprising:
   establishing a logical overlay tunnel with a second computer system that is reachable from the first computer system via a first uplink and a second uplink amongst multiple different uplinks that support the logical overlay tunnel, wherein the first computer system includes multiple different physical network interface cards (PNICs) that are respectively mapped to the multiple different uplinks;
   generating and sending, over the logical overlay tunnel via the first uplink, a first encapsulated monitoring packet uniquely identifying the first uplink;
   determining first performance metric information associated with the first uplink based on a first reply identifying the first uplink from the second computer system;
   generating and sending, over the logical overlay tunnel via the second uplink, a second encapsulated monitoring packet uniquely identifying the second uplink;
   determining second performance metric information associated with the second uplink based on a second reply identifying the second uplink from the second computer system; and
   based on the first performance metric information and the second performance metric information, selecting the first uplink or the second uplink to send one or more encapsulated data packets over the logical overlay tunnel.

2. The method of claim 1, wherein generating and sending the first encapsulated monitoring packet comprises:
   generating a first inner packet that causes the second computer system to loop back the first inner packet, being the first reply, to the first computer system; and
   encapsulating the first inner packet with a first outer header that is addressed from a first virtual tunnel endpoint (VTEP) supported by the first computer system to a second VTEP supported by the second computer system.

3. The method of claim 2, wherein generating and sending the first encapsulated monitoring packet comprises:
   generating the first inner packet as an echo packet that specifies a destination address associated with the first computer system.

4. The method of claim 2, wherein generating and sending the first encapsulated monitoring packet comprises:
   generating the first inner packet to specify one or more of: an interface name identifying the first uplink, a sequence number, and a timestamp.

5. The method of claim 1, further comprising:
   establishing a monitoring session between the first computer system and the second computer system according to a continuity check protocol for sending the first encapsulated monitoring packet and the second encapsulated monitoring packet.

6. The method of claim 1, wherein determining the first performance metric information comprises:
   based on the first reply, determining the first performance metric information specifying one or more of: connectivity status, round trip time (RTT), packet loss, and delay associated with the first uplink.

7. The method of claim 1, further comprising:
   in response to detecting a failure or performance degradation associated with the first uplink based on the first performance metric information, selecting the second uplink over the first uplink to send the one or more encapsulated data packets.

8. A non-transitory computer-readable storage medium that includes a set of instructions which, in response to execution by a processor of a first computer system, cause the processor to perform uplink-aware logical overlay tunnel monitoring, wherein the method comprises:
   establishing a logical overlay tunnel with a second computer system that is reachable from the first computer system via a first uplink and a second uplink amongst multiple different uplinks that support the logical overlay tunnel, wherein the first computer system includes multiple different physical network interface cards (PNICs) that are respectively mapped to the multiple different uplinks;
   generating and sending, over the logical overlay tunnel via the first uplink, a first encapsulated monitoring packet uniquely identifying the first uplink;
   determining first performance metric information associated with the first uplink based on a first reply identifying the first uplink from the second computer system;
   generating and sending, over the logical overlay tunnel, a second encapsulated monitoring packet uniquely identifying the second uplink;
   determining second performance metric information associated with the second uplink based on a second reply identifying the second uplink from the second computer system; and
   based on the first performance metric information and the second performance metric information, selecting the first uplink or the second uplink to send one or more encapsulated data packets over the logical overlay tunnel.

9. The non-transitory computer-readable storage medium of claim 8, wherein generating and sending the first encapsulated monitoring packet comprises:
   generating a first inner packet that causes the second computer system to loop back the first inner packet, being the first reply, to the first computer system; and
   encapsulating the first inner packet with a first outer header that is addressed from a first virtual tunnel endpoint (VTEP) supported by the first computer system to a second VTEP supported by the second computer system.

10. The non-transitory computer-readable storage medium of claim 9, wherein generating and sending the first encapsulated monitoring packet comprises:
    generating the first inner packet as an echo packet that specifies a destination address associated with the first computer system.

11. The non-transitory computer-readable storage medium of claim 9, wherein generating and sending the first encapsulated monitoring packet comprises:
    generating the first inner packet to specify one or more of: an interface name identifying the first uplink, a sequence number, and a timestamp.

12. The non-transitory computer-readable storage medium of claim 8, wherein the method further comprises:
    establishing a monitoring session between the first computer system and the second computer system according to a continuity check protocol for sending the first encapsulated monitoring packet and the second encapsulated monitoring packet.

13. The non-transitory computer-readable storage medium of claim 8, wherein determining the first performance metric information comprises:
based on the first reply, determining the first performance metric information specifying one or more of: connectivity status, round trip time (RTT), packet loss, and delay associated with the first uplink.

14. The non-transitory computer-readable storage medium of claim 8, wherein the method further comprises:
in response to detecting a failure or performance degradation associated with the first uplink based on the first performance metric information, selecting the second uplink over the first uplink to send the one or more encapsulated data packets.

15. A computer system, being a first computer system, comprising:
a processor;
a first physical network interface controller (PNIC) associated with a first uplink;
a second PNIC associated with a second uplink; and
a non-transitory computer-readable medium having stored thereon instructions that, when executed by the processor, cause the processor to:
establish a logical overlay tunnel with a second computer system that is reachable from the first computer system via the first uplink and the second uplink, wherein the first and second uplinks support the logical overlay tunnel;
generate and send, over the logical overlay tunnel via the first uplink, a first encapsulated monitoring packet uniquely identifying the first uplink;
determine first performance metric information associated with the first uplink based on a first reply identifying the first uplink from the second computer system;
generate and send, over the logical overlay tunnel via the second uplink, a second encapsulated monitoring packet uniquely identifying the second uplink;
determine second performance metric information associated with the second uplink based on a second reply identifying the second uplink from the second computer system; and
based on the first performance metric information and the second performance metric information, select the first uplink or the second uplink to send one or more encapsulated data packets over the logical overlay tunnel.

16. The computer system of claim 15, wherein the instructions that cause the processor to generate and send the first encapsulated monitoring packet cause the processor to:
generate a first inner packet that causes the second computer system to loop back the first inner packet, being the first reply, to the first computer system; and
encapsulate the first inner packet with a first outer header that is addressed from a first virtual tunnel endpoint (VTEP) supported by the first computer system to a second VTEP supported by the second computer system.

17. The computer system of claim 16, wherein the instructions that cause the processor to generate and send the first encapsulated monitoring packet cause the processor to:
generate the first inner packet as an echo packet that specifies a destination address associated with the first computer system.

18. The computer system of claim 16, wherein the instructions that cause the processor to generate and send the first encapsulated monitoring packet cause the processor to:
generate the first inner packet to specify one or more of: an interface name identifying the first uplink, a sequence number, and a timestamp.

19. The computer system of claim 15, wherein the instructions further cause the processor to:
establish a monitoring session between the first computer system and the second computer system according to a continuity check protocol for sending the first encapsulated monitoring packet and the second encapsulated monitoring packet.

20. The computer system of claim 15, wherein the instructions that cause the processor to determine the first performance metric information cause the processor to:
based on the first reply, determine the first performance metric information specifying one or more of: connectivity status, round trip time (RTT), packet loss, and delay associated with the first uplink.

21. The computer system of claim 15, wherein the instructions further cause the processor to:
in response to detecting a failure or performance degradation associated with the first uplink based on the first performance metric information, select the second uplink over the first uplink to send the one or more encapsulated data packets.

* * * * *